(12) United States Patent
Kanayama et al.

(10) Patent No.: US 10,868,967 B2
(45) Date of Patent: Dec. 15, 2020

(54) LIGHT SOURCE UNIT AND MOVABLE BODY

(71) Applicant: PANASONIC INTELLECTUAL PROPERTY MANAGEMENT CO., LTD., Osaka (JP)

(72) Inventors: Yoshihiko Kanayama, Hyogo (JP); Yohei Chingyo, Osaka (JP); Makoto Kai, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/570,133

(22) Filed: Sep. 13, 2019

(65) Prior Publication Data

US 2020/0099843 A1 Mar. 26, 2020

(30) Foreign Application Priority Data

Sep. 20, 2018 (JP) .................................. 2018-175828

(51) Int. Cl.
*H04N 5/235* (2006.01)
*H04N 5/30* (2006.01)
(Continued)

(52) U.S. Cl.
CPC ......... *H04N 5/2354* (2013.01); *G01N 21/359* (2013.01); *G02B 5/208* (2013.01); *H04N 5/30* (2013.01); *H04N 5/33* (2013.01); *B60R 1/00* (2013.01); *B60R 1/1207* (2013.01); *B60R 11/04* (2013.01); *B60R 2001/1223* (2013.01); *B60R 2001/1253* (2013.01);
(Continued)

(58) Field of Classification Search
CPC .......... B60R 1/00; B60R 1/12; B60R 1/1207; B60R 11/04; B60R 2001/1223; B60R 2001/1253; B60R 2300/103; B60R 2300/106; B60R 2300/8053; B60R 2300/806; B60R 2300/8066; G01N 21/3554; G01N 21/359; G02B 5/208; G02F 2001/3528; H04N 5/2354; H04N 5/30; H04N 5/33
See application file for complete search history.

(56) References Cited

U.S. PATENT DOCUMENTS

2009/0078870 A1 3/2009 Haruna
2016/0061717 A1* 3/2016 Bawolek ................ G02B 21/16
356/402
2018/0059003 A1* 3/2018 Jourdainne ........ G01N 33/0054

FOREIGN PATENT DOCUMENTS

WO 2007/083741 7/2007

* cited by examiner

*Primary Examiner* — Mark R Gaworecki
(74) *Attorney, Agent, or Firm* — Greenblum & Bernstein, P.L.C.

(57) ABSTRACT

A light source unit includes a substrate and a light source. The light source is mounted on the substrate. At least one sensor is configured to detect the infrared light. The at least one sensor detects a wavelength component of the infrared light in a range of wavelengths from 920 nm to 960 nm better than a wavelength component of the infrared light out of the range. The light source device emits the infrared light having a peak wavelength smaller than 920 nm when the light source has a temperature of 25° C. or lower. The peak wavelength of the infrared light emitted from the light source device increases as the temperature of the light source increases from the temperature of 25° C.

13 Claims, 7 Drawing Sheets

(51) Int. Cl.
*H04N 5/33* (2006.01)
*G02B 5/20* (2006.01)
*G01N 21/359* (2014.01)
*B60R 1/12* (2006.01)
*B60R 1/00* (2006.01)
*B60R 11/04* (2006.01)
*G01N 21/3554* (2014.01)

(52) U.S. Cl.
CPC ... *B60R 2300/103* (2013.01); *B60R 2300/106* (2013.01); *B60R 2300/806* (2013.01); *B60R 2300/8053* (2013.01); *B60R 2300/8066* (2013.01); *G01N 21/3554* (2013.01)

LIGHT SOURCE UNIT AND MOVABLE BODY

INCORPORATION BY REFERENCE

The entire disclosure of Japanese Patent Application No. 2018-175828 filed on Sep. 20, 2018 including specification, claims, drawings and abstract is incorporated herein by reference in its entirety.

TECHNICAL FIELD

This disclosure relates to a light source unit, and also to a movable body.

BACKGROUND

Conventionally, light source units have been known, including a light source unit described in WO2007/083741. The light source unit includes a light source device for emitting infrared light and an image pickup part for receiving the infrared light. The light source unit may be mounted on a front portion of a vehicle. In this case, road conditions can be detected by means of the image pickup unit that images the infrared light emitted from the light source device and reflected from a road.

In a case where the light source unit includes the light source device which emits infrared light and the image pickup unit which receives the infrared light, it is desired for the image pickup unit to capture clear images at any time of the day or night.

With this in view, it is an object of this disclosure to provide a light source unit and the like capable of capturing a clear image at any time of the day or night, the light source unit including a light source device which emits infrared light and at least one sensor which receives the infrared light.

SUMMARY

To solve the object, in an aspect of this disclosure, a light source unit comprises a light source device configured to emit infrared light, the light source device comprising a substrate and a light source mounted on the substrate; and at least one sensor configured to detect the infrared light, wherein the at least one sensor detects a wavelength component of the infrared light in a range of wavelengths from 920 nm to 960 nm better than a wavelength component of the infrared light out of the range, the light source device emits the infrared light having a peak wavelength smaller than 920 nm when the light source has a temperature of 25° C. or lower, and the peak wavelength of the infrared light emitted from the light source increases as the temperature of the light source increases from the temperature of 25° C.

According to this disclosure, it becomes possible to implement the light source unit that includes the light source which emits infrared light and the at least one sensor which receives the infrared light, and is capable of capturing clear images at any time of the day or night.

BRIEF DESCRIPTION OF DRAWINGS

The figures depict one or more implementations in accordance with the present teaching, by way of example only, not by way of limitations. In the figures, like reference numerals refer to the same or similar elements.

An embodiment of the present disclosure will be described based on the following figures, wherein.

The figures depict one or more implementations in accordance with the present teaching, by way of example only, not by way of limitations. In the figures, like reference numerals refer to the same or similar elements.

DESCRIPTION OF EMBODIMENTS

Figure 1:
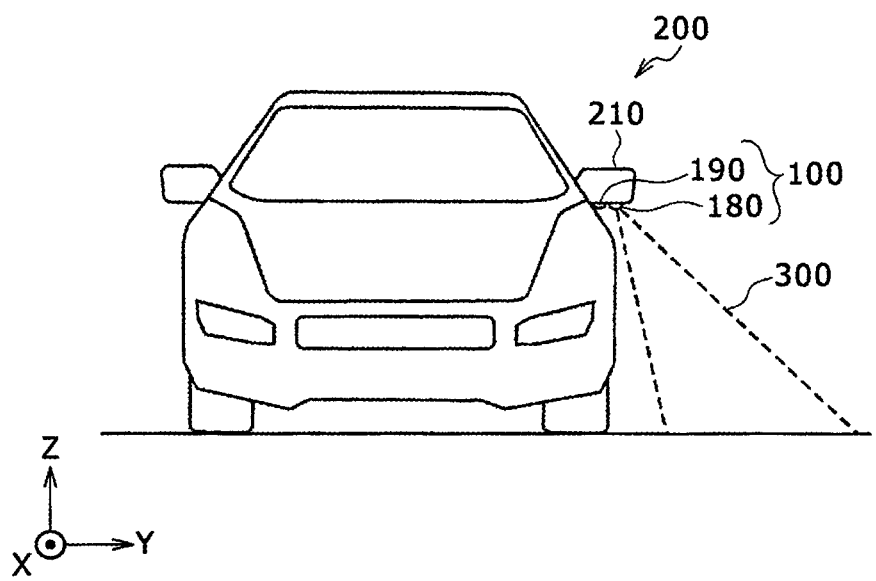
FIG. 1 is a front view of a vehicle according to an embodiment of this disclosure.

Hereinafter, an embodiment of this disclosure will be described in detail with reference to the attached drawings. When two or more embodiments and modification examples are explained in the following description, it is originally intended that characteristic features in the embodiments or the modification examples may be combined as appropriate to implement a new embodiment. It should be noted that identical or equivalent components in examples described below are identified by identical reference numerals throughout the drawings, and descriptions related to the components will not be repeated. Further, the draiwings include schematic diagrams, and the ratio of dimensions, such as length, width, and height, of each component may not necessarily be consistent in different drawings. In addition, numerical values, shapes, materials, components, a layout of the components, and a connection form of the components, and other features indicated in the following description, are presented by way of illustration, and should not be regarded as limitation to this disclosure. Components other than those recited in an independent claim representing the most generic concept are optional, non-essential components. In the specification, the terms "approximately" and "substantially" are used in the same meaning as "roughly", and, for example, an expression "substantially circle" denotes a geometry of a circle that is commonly perceived as a circle with ordinary human cognition. In the drawings and the following description, an X direction indicates a front and rear direction of a vehicle 200 in which a light source unit 100 is installed, a Y direction indicates a width direction of the vehicle 200, and a Z direction indicates a vertical direction of the vehicle 200. The X direction, the Y direction, and the Z direction are orthogonal to each other.

FIG. 1 is a front view of the vehicle 200 according to an embodiment of this disclosure. As shown in FIG. 1, the vehicle 200 includes the light source unit 100 installed below a side mirror 210, and the light source unit 100 includes a light source device 180 and at least one sensor 190. The at least one sensor 190 may be an imaging device, a photography equipment, or a camera. Also, the at least one sensor 190 may be include in any of them. The light source device 180 emits infrared light 300 toward a vehicle sideward and downward region. The at least one sensor 190 receives the infrared light 300 reflected from a road surface to obtain an image of the road surface illuminated by an infrared light source 120. The vehicle 200 displays the image of the road surface in the vehicle sideward and downward region captured by the at least one sensor 190 onto a display unit (not illustrated) installed in a vehicle compartment. This allows a driver and/or a passenger in the vehicle to view an image of a side region when driving the vehicle 200 in reverse for parking. In this way, parking support is given to the driver and/or the passenger. It should be noted that although, in the example illustrated in FIG. 1, the vehicle 200 includes the light source unit 100 in the side mirror 210 only on one side of the vehicle 200, the light source unit may be installed for each of two side mirrors on both sides of the vehicle. In this case, road surfaces on both sides of the vehicle can be captured by two light source units.

Figure 2:
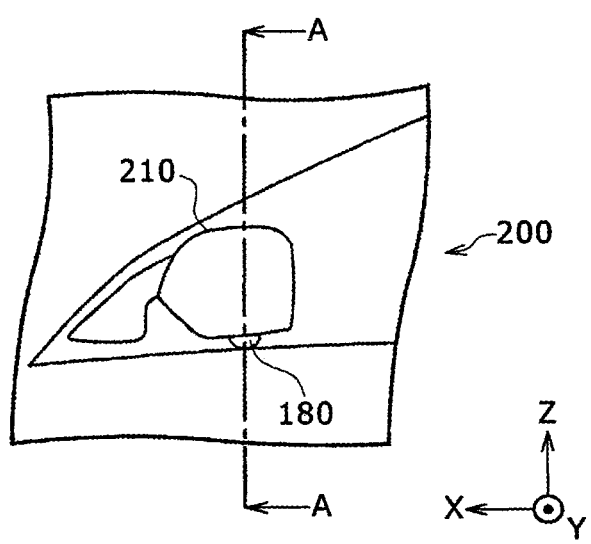
FIG. 2 is an enlarged side view of a portion of the vehicle around a side mirror.
Figure 3:
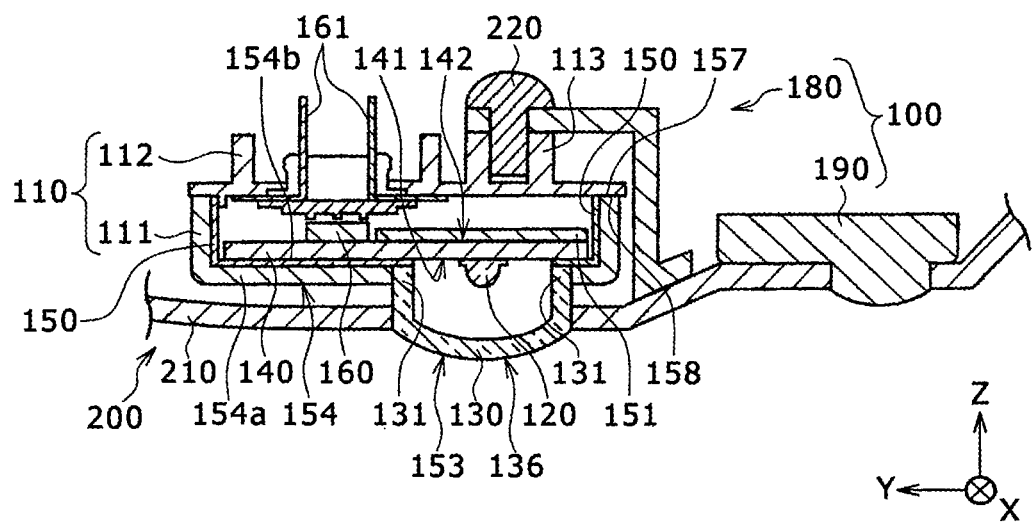
FIG. 3 is an enlarged cross section view showing a part of a cross section taken along line A-A indicated in FIG. 2, and the part of a cross section that passes through the light source and includes a portion of the vehicle in a width direction and in a height direction of the vehicle.

FIG. 2 is an enlarged side view showing a portion of the vehicle 200 around the side mirror 210. Further, FIG. 3 is an enlarged cross section view showing a part of cross section taken along line A-A indicated in FIG. 2, and the part of cross section passes through the light source device 180 and includes a portion of the vehicle in the Y direction and in the Z direction. As shown in FIG. 3, the light source device 180 has a housing 110, the infrared light source 120, a lens 130, a substrate 140, a first metallic body 150, a second metallic body 151, and a terminal unit 160. The housing 110 includes a housing body 111 and a lid 112, for example. The housing body 111 is a box shaped component having an opening on an upper side thereof. The lid 112 is placed on the top of the housing body 111 to close the opening of the housing body 111 in a state where the infrared light source 120 is placed within the housing body 111.

The housing 110 has a fixture part 113 attached to the side mirror 210 of the vehicle 200. Specifically, the fixture part 113 is provided on the lid 112, and has a threaded hole into which a screw 220 is screwed. The screw 220 is inserted through a screw hole formed in the side mirror 210 and screwed into the threaded hole in the fixture part 113, to thereby fix the light source unit 100 to the vehicle 200.

As a material of the housing 110, for example, a resin material, such as an acrylic resin or a polycarbonate resin, a metallic material, and other materials may be used as appropriate. On the other hand, the lid 112 is composed of a material having a thermal conductivity higher than that of the housing body 111. Here, the housing body and the lid may be formed of the same material, and the housing body may be formed of a material having a thermal conductivity higher than that of the lid. The infrared light source 120 is formed of, for example, a solid conductor element, such as a light emitting diode (LED) which emits infrared light 300 (see FIG. 1), and the infrared light source 120 is sealed by a resin part. The lens 130 is arranged in the housing 110 so as to cover a region downward of the infrared light source 120 that is a light emission side of the infrared light source 120. Then, the lens 130 is configured to control light distribution of the infrared light 300 emitted from the infrared light source 120. Further, the lens 130 is spaced from the infrared light source 120 with a light emitting surface 136 of the lens 130 being exposed to the outside from a lower surface of the side mirror 210. The lens 130 is formed, for example, of a glass material having transparency to light or a transparent resin material, such as silicone, an acrylic resin, or a polycarbonate resin. It should be noted that although the lens 130 has, on its light emission side, a convex shape protruding downward, the shape of the lens 130 is not limited to the convex shape and may be formed in a planar shape, for example.

The infrared light source 120 is mounted on the substrate 140. While there is no specific limitation to the material of the substrate 140, for example, a metallic substrate, a ceramic substrate, a resin substrate, and other substrates may be used as the substrate 140. The substrate 140 may be a flexible substrate or a rigid substrate. An end edge 131 of the lens 130 may be in thermal contact with the substrate 140 via the first metallic body 150 having a thermal conductivity higher than thermal conductivities of the lens 130 and the substrate 140. In addition, the housing body 111 may also be in thermal contact with the substrate 140 via the first metallic body 150 whose thermal conductivity is higher than thermal conductivities of the housing body 111 and the substrate 140.

The first metallic body 150 is formed of a metallic material, such as, for example, an aluminum metal or stainless steel, having a high thermal conductivity, and arranged on an inner surface of the housing body 111 while contacting the entire inner surface of the housing body 111 and conforming to the entire inner surface of the housing body 111. The substrate 140 is in thermal contact with the housing body 111 through the first metallic body 150. When the first metallic body 150 is provided, heat liberated from the infrared light source 120 is easily dissipated into the housing 110, which can lead to an improved heat dissipation property of the light source unit 100. Although a part of the first metallic body 150 is disposed between the end edge 131 of the lens 130 and the substrate 140 in this embodiment, the first metallic body may not necessarily include a region disposed between the end edge of the lens and the substrate. Further, although, in this embodiment, a side surface of the substrate 140 is not in contact with the first metallic body 150, the side surface of the substrate may be in contact with the first metallic body.

The housing body 111, the first metallic body 150, and the lens 130 cooperatively constitute a light source cover 153. In the cross section view of FIG. 3, a portion of the light source cover 153 that is located on each side of the lens 130 in the Y direction and arranged to extend along the Y direction constitutes a flange portion 154 which contacts with the substrate 140. Meanwhile, the lens 130 constitutes a cover portion of the light source cover 153 that covers the infrared light source 120 on its light emission side. The lid 112 may have a thermal conductivity that is higher than thermal conductivities of the housing body 111, the first metallic body 150, and the lens 130. The lid 112 is brought into contact with the light source cover 153, so that the lid 112 and the light source cover 153 cooperate to seal the infrared light source 120 from an outside region and form a heat sink having a thermal conductivity higher than that of the light source cover 153 itself. Although it has been described that the flange portion 154 is brought into direct contact with the substrate 140, the flange portion may contact indirectly with the substrate through another member. Further, while it has also been described that the lid 112 is brought into direct contact with the light source cover 153, the lid may contact indirectly with the light source cover through another member.

The flange portion 154 may have a multilayer structure including two or more layers, in which adjacent layers in a thickness direction of the structure may be joined to each other through a fusion process. In this embodiment, an annular end surface 157 on a side of the light source cover 153 in one Z direction is entirely contacted with an end surface 158 on a side of the lid 112 in the other opposite Z direction. The annular end surface 157 of the light source cover 153 and a portion of the end surface 158 of the lid 112 that is in contact with the annular end surface 157 constitute an annular sealing portion. In the above-described structure, because the light source unit 100 includes the annular sealing portion, it is possible to substantially or completely prevent rain water and other moisture entering an inside region of the light source cover 153. This can in turn protect, electronic and other components mounted on the substrate 140 against becoming deteriorated.

Further, in a case where the flange portion 154 has the multilayer structure, the flange portion 154 may include a transparent layer 154a and a color-tinted layer 154b. In this case, laser light can pass through the transparent layer 154a and easily reach the color-tinted layer 154b, which can facilitate laser welding between the transparent layer 154a and the color-tinted layer 154b. In addition, the flange portion 154 has a uniform thickness in its entire region in this embodiment, while the flange portion may include a first flange portion having a first thickness and a second flange portion having a second thickness smaller than the first thickness. In this configuration, strength of the flange portion can be locally decreased to allow for flexible deformation of the flange portion. Accordingly, even though the outer surface or a contour of the cover portion is a free-form surface, the flange portion can be easily deformed so as to conform to the shape of the outer surface of the cover portion. In this way, the flange portion can be fixed onto the cover portion in an intimately contacted state.

The second metallic body 151 is a heat dissipation member for efficiently dissipating heat generated in the infrared light source 120. The second metallic body 151 is disposed on a back surface 142 of the substrate 140 that is opposite to a mounting surface 141 of the substrate 140 on which the infrared light source 120 is mounted. As a material of the second metallic body 151, for example, a material having a high thermal conductivity, such as an aluminum metal or stainless steel may be used. Although the second metallic body 151 has a plate shape in this embodiment, there is no specific limitation to the shape of the second metallic body.

The terminal unit 160 functions to supply the infrared light source 120 with power provided from an external power source or the like, and includes a wiring line 161 through which an electric current from the external power source flows. The terminal unit 160 is electrically connected to the wiring line 161 via a not-illustrated metal wire or other wires. In this embodiment, the at least one sensor 190 is arranged between the infrared light source 120 and a body of the vehicle 200. The at least one sensor 190 includes an image pickup element 195, such as, for example, a CCD (Charge Coupled Device) image sensor, or a CMOS (Complementary Metal Oxide Semiconductor) image sensor (see FIG. 4).

Figure 4:
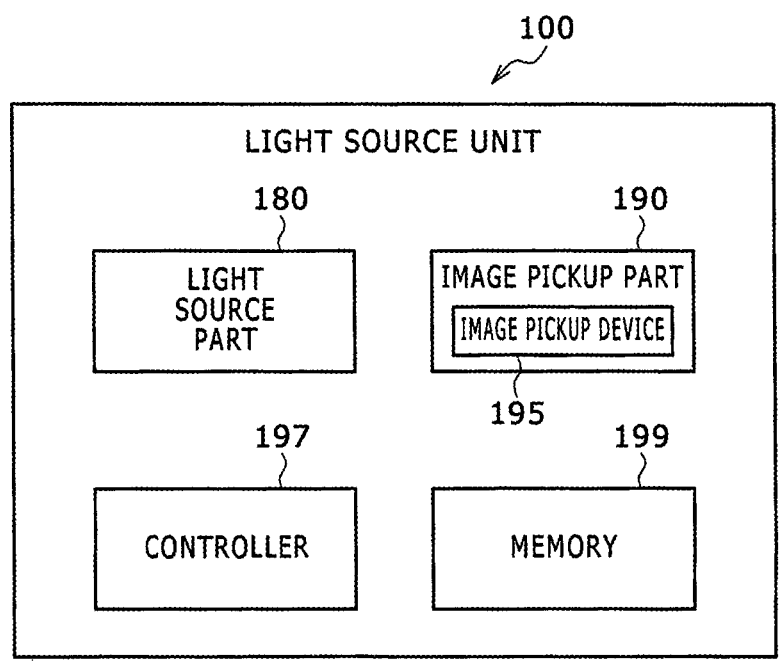
FIG. 4 is a block diagram showing main components of a light source unit mounted on the vehicle.

FIG. 4 is a block diagram showing main components of the light source unit 100. As shown in FIG. 4, the light source unit 100 includes, in addition to the light source device 180 and the at least one sensor 190, a controller 197 and a memory 199. The image pickup element 195 in the at least one sensor 190 functions to pick up an image and also functions as an illuminance sensor. It should be noted that the illuminance sensor may not necessarily be the image pickup element, and may be arranged outside the at least one sensor 190. In this case, the illuminance sensor may be placed at any position where the illuminance sensor is able to detect an illuminance of light emitted from the sun, in the vehicle 200. In this regard, the illuminance sensor may be placed in the vicinity of the image pickup element 195, which can lead to precise determination of timing for lighting the infrared light source 120 as described below with reference to FIG. 5. Meanwhile, the controller 197 and the memory 199 may be installed at any locations within the vehicle, and may be placed, for example, in a region inside an instrument panel that is a front-side equipment compartment for accommodating a navigation system, an audio system, a passenger seat air bag, and other components.

The illuminance sensor detects an ambient brightness, such as a degree of being "bright" or "dark". The image pickup element 195 is a light receiving element capable of sensing the ambient brightness. It should be noted that when the illuminance sensor is installed outside the at least one sensor 190, the illuminance sensor may be implemented by, for example, a sensor using a phototransistor, a sensor using a photodiode, a sensor in which an amplification circuit is added to a photodiode, or other sensors. The controller 197 may be implemented, for example, by a microcomputer, and includes a CPU (Central Processing Unit). The memory 199 may be a nonvolatile memory, such as a ROM (Read Only Memory) or a volatile memory, such as a RAM (Random Access Memory). The CPU reads a program and other data previously stored in the memory 199 and executes the read program. The nonvolatile memory is used for previously storing a control program, a predetermined threshold value, and other data or values, while the volatile memory is used for temporarily storing the read program and processing data. The controller 197 may be a dedicated controller exclusively used for the light source unit, or may be implemented by a controller that centrally controls the vehicle 200 and also functions as the controller for the light source unit. Similarly, the memory 199 may be a dedicated memory exclusively used for the light source unit, or may be implemented by a memory for the vehicle 200 that also functions as the memory for the light source unit 100.

Figure 5:
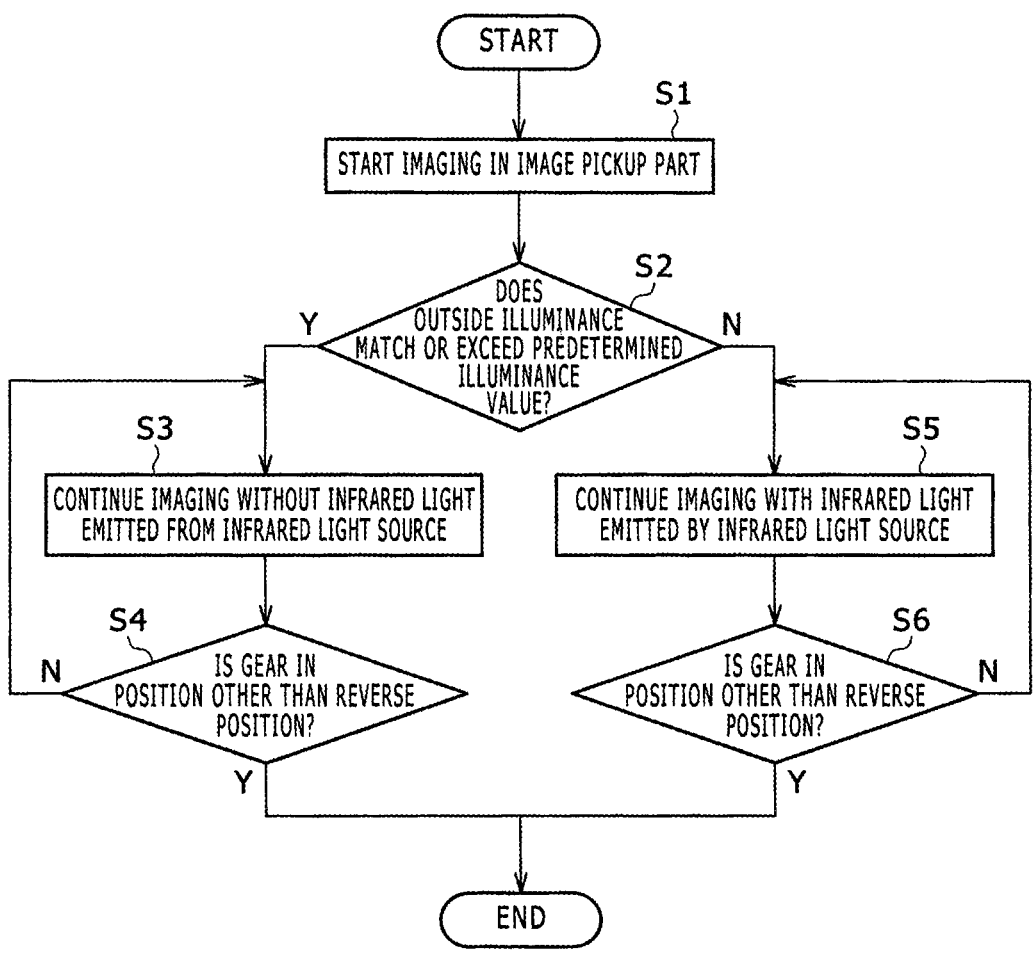
FIG. 5 is a flowchart of process steps performed by a controller of the light source unit during operation of the light source unit.

FIG. 5 is a flowchart representing process steps performed during operation of the light source unit 100 by the controller 197 for the light source unit 100. Referring to FIG. 5, control operation starts at a time when a driver of the vehicle 200 selects a reverse position of a gear, and the controller 197 causes the at least one sensor 190 to start image capturing in step S1. Next, in step S2, the controller 197 determines, based on both a signal from the image pickup element 195, which also functions as the illuminance sensor, and data of a predetermined illuminance stored in the memory 199, whether or not an illuminance outside exceeds the predetermined illuminance. When an affirmative determination is obtained in step S2, operation proceeds to step S3 in which the controller 197 performs control processing of causing the at least one sensor 190 to continue capturing the image under a condition that no power is supplied to the infrared light source 120. Then, operation proceeds to step S4. In step S4, the controller 197 determines whether or not the gear is changed to any position from the reverse position, in response to a signal indicative of a selected position of the gear that is received from a gear position sensor. When a negative determination is obtained in step S4, processing in step S3 is repeated. Conversely, when an affirmative determination is obtained in step S4, the control operation is finished.

On the other hand, when a negative determination is obtained in step S2, operation proceeds to step S5. In step S5, the controller 197 performs control processing of causing the at least one sensor 190 to continue capturing the image and supplying the infrared light source 120 with power for allowing the infrared light source 120 to emit infrared light. In following step S6, the controller 197 determines, in response to the signal indicative of the selected position received from the gear position sensor, whether or not the gear is changed to any position from the reverse position. When a negative determination is obtained in step S6, processing in step S5 is repeated, or when an affirmative determination is obtained in step S6, control operation is finished.

It should be noted that the light source unit in an aspect of this disclosure may be mounted on a movable body, such as, for example, the vehicle 200, a ship, an airplane, a robot, or a conveyer machine in a warehouse, or may be mounted on a machine other than the movable body, such as, for example, a surveillance camera, a portable imaging apparatus which can be used by a human for photographing a wild animal or other subjects. Here, when the light source unit is mounted on a machine other than the movable body, control operation may be started at a time when a power switch of the machine is turned on, and may be finished at a time when the power switch is turned off.

Next, the sensitivity to infrared light received by the at least one sensor 190 and wavelength characteristics of the infrared light 300 emitted from the light source unit 100 to the outside region will be described in detail. The at least one sensor 190 is configured to be more apt to sense a wavelength component of infrared light in a range of wavelengths from 920 nm to 960 nm than to sense a wavelength component of the infrared light out of the range.

Specifically, in the light source unit 100, the infrared light source 120 does not emit infrared light, as described above, during the daytime when the illuminance outside is high. That is, during the daytime having high outside illuminance, the at least one sensor 190 uses visible light irradiated from the sun in order to capture an image. On the other hand, during the nighttime, the at least one sensor 190 uses the infrared light emitted from the infrared light source 120 to capture an image in terms of excellent properties of the infrared light, such as resistance to diffusion and invisibility to human eyes.

In this connection, because the infrared light has a detrimental effect of distorting a captured image or the like, a clearer image can be captured, during the daytime, under a condition that infrared light is absent. However, in some cases, settings of the at least one sensor 190 are not changed between the daytime and the nighttime in view of reducing manufacturing costs and operating costs. In these cases, it is necessary that the at least one sensor 190 should be able to capture an image of infrared light having wavelengths at least in a part of the range of infrared wavelengths.

In this situation, it is taken into consideration that a wavelength component of infrared light in a range of wavelengths from 920 nm to 960 nm contained in the infrared light that is irradiated from the sun is apt to be absorbed in water vapor in the atmosphere of the stratosphere. Therefore, at ground level, an intensity of infrared light having the wavelength component in the range of wavelengths from 920 nm to 960 nm is lower than an intensity of infrared light having a wavelength component of infrared light out of that range. With this in view, a sensitivity to the wavelength component in the range of wavelengths from 920 nm to 960 nm is established to be higher than a sensitivity to the wavelength component out of the range, which can advantageously reduce the detrimental effect of the infrared light on an image that is captured during the daytime.

Figure 6:
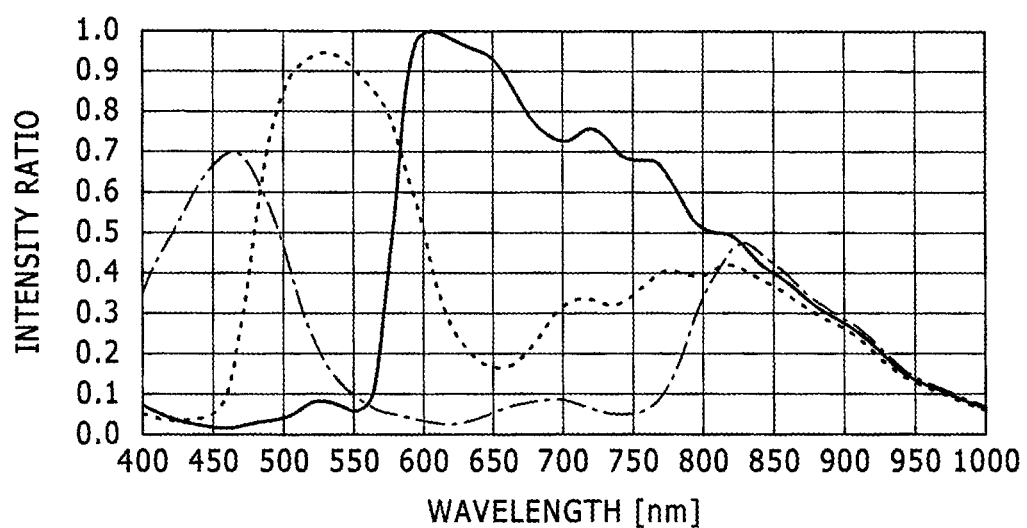
FIG. 6 is a diagram representing a relationship between wavelengths of red light, blue light, and green light, and sensitivities to the wavelengths, in an example of an image pickup element installable in at least one sensor of the light source unit.
Figure 7:
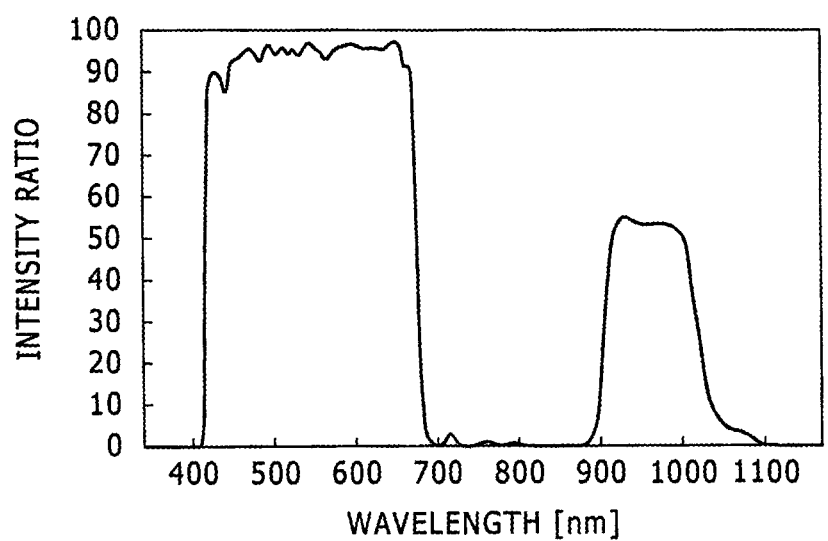
FIG. 7 is a diagram for explaining light passing through an example of a pass filter incorporated in the at least one sensor.
Figure 8:
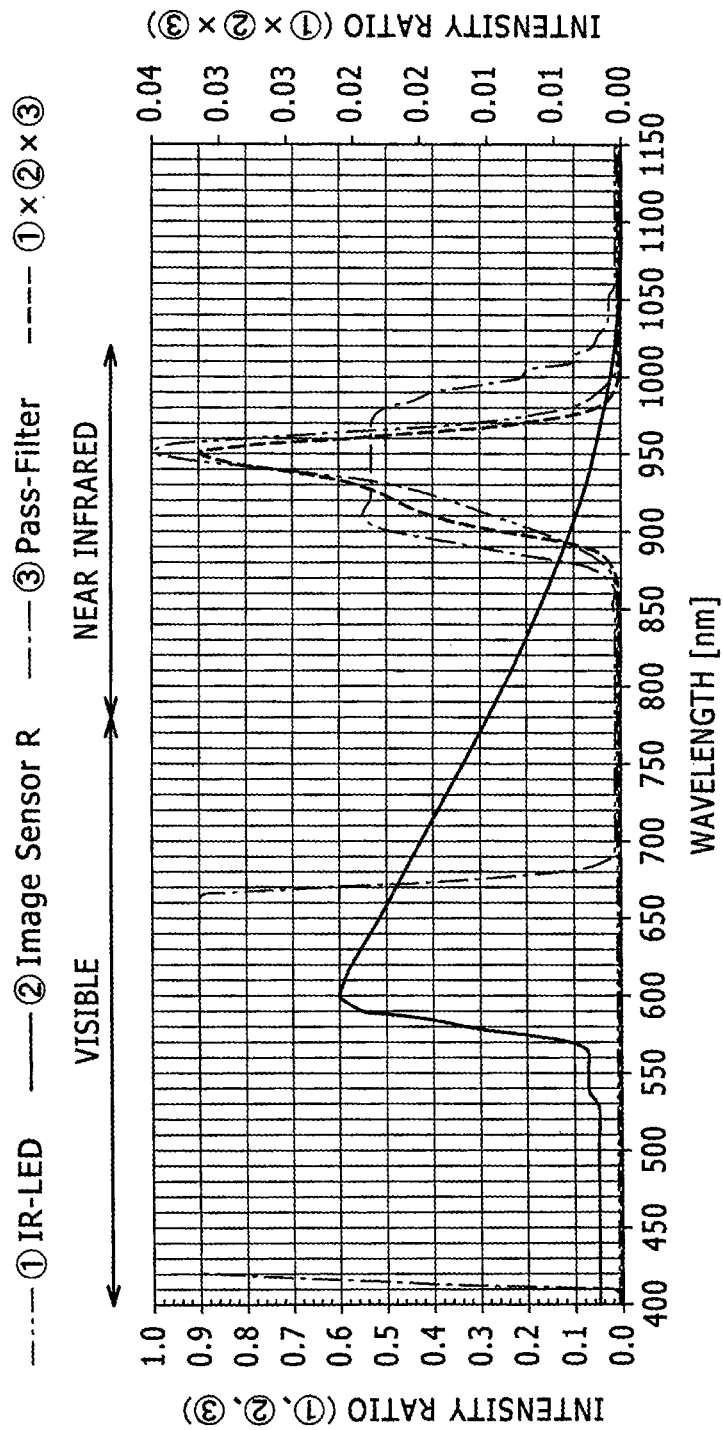
FIG. 8 is a diagram for explaining infrared light that leads to an increase in sensitivity of the at least one sensor depending on the sensitivities of the image pickup element and a light transmission property of the pass filter.

FIG. 6 is a graph representing a relationship between wavelengths of red light, blue light, and green light, and sensitivities to the light in an exemplary image pickup element 195, and FIG. 7 is a diagram for explaining light that is allowed to pass through an exemplary pass filter incorporated in the at least one sensor 190. FIG. 8 is a diagram for explaining an increase in sensitivity to infrared light based on the sensitivity of the exemplary image pickup element 195 and a light transmission property of the exemplary pass filter. In the diagrams of FIGS. 6 to 8 and in FIGS. 9 and 10, which will be referred to in the description below, the vertical axis represents a ratio of intensities of light that is a dimensionless number.

The at least one sensor 190 includes, for example, the exemplary image pickup element 195 described with reference to FIG. 6 and the exemplary pass filter described with reference to FIG. 7. As shown in FIG. 6, in the exemplary image pickup element 195, the sensitivity to red light (including infrared light) reaches the peak for light having a wavelength of approximately 600 nm, and subsequently decreases as the wavelength of light becomes longer. Meanwhile, as shown in FIG. 7, the pass filter has a property of blocking both light having wavelengths from 700 nm to 860 nm and light having wavelengths equal to or greater than 1050 nm while transmitting light having wavelengths from 890 nm to 980 nm. Accordingly, when infrared light whose peak wavelength is approximately 950 nm (indicated by a chain double-dashed line in FIG. 8) is used, the at least one sensor 190 has a sensitivity to the infrared light determined from the sensitivity to red light of the image pickup element 195 and the light transmission property of the pass filter as indicated by a dotted line in FIG. 8. In this way, the at least one sensor 190 becomes able to capture the infrared light with a high sensitivity. As described above, the exemplary image pickup element 195 may be used together with a pass filter that blocks at least light including a wavelength from 700 nm to 860 nm and a wavelength equal to or greater than 1050 nm and passes at least light including a wavelength in a range from 890 nm to 980 nm, such as, for example, the exemplary pass filter described above, in order to implement the at least one sensor 190 having an excellent capability. That is, the at least one sensor 190 is capable of capturing, with a higher sensitivity, an infrared light component in the range of wavelengths from 920 nm to 960 nm, the infrared light component being apt to be absorbed in water vapor in the atmosphere of the stratosphere, compared to a case of capturing infrared light components out of that range.

Next, the infrared light 300 emitted from the light source unit 100 to the outside region will be explained. The light source device 180 emits infrared light whose peak wavelength becomes smaller than 920 nm when the infrared light source 120 has a temperature of 25° C. or lower. Then, the peak wavelength of the infrared light emitted from the light source device 180 is shifted to a longer wavelength side as the temperature of the infrared light source 120 increases from 25° C.

Figure 9:
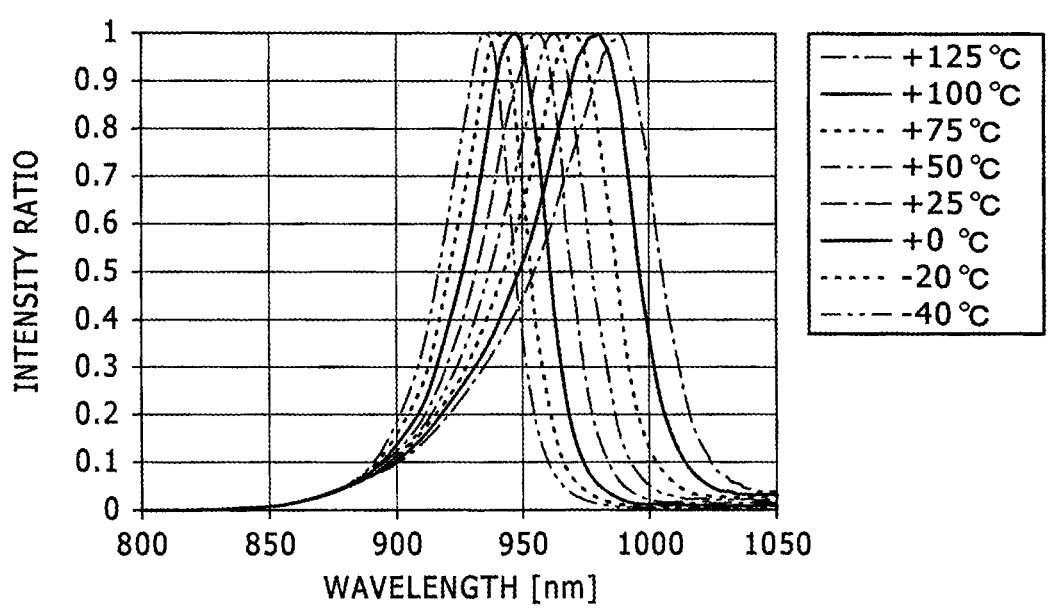
FIG. 9 is a diagram for explaining temperature dependence of an infrared light source.
Figure 10:
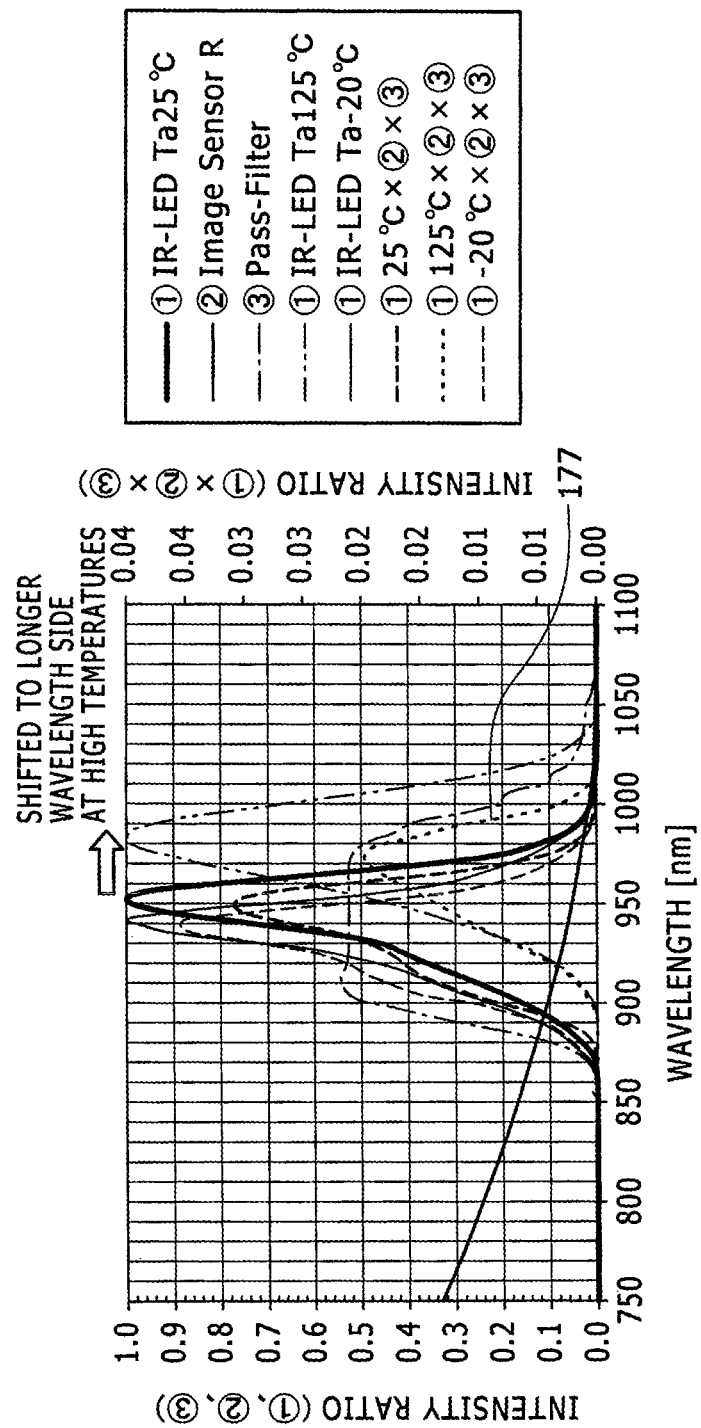
FIG. 10 is a diagram for explaining a problem associated with the temperature dependence of the infrared light source.

FIG. 9 is a diagram for explaining the temperature dependence of an infrared light source, and FIG. 10 is a diagram for explaining a problem associated with the temperature dependence of the infrared light source. As shown in FIG. 9, the infrared light source has a property of emitting infrared light whose peak wavelength (a wavelength at which the spectrum has the highest intensity) is shifted to a longer wavelength side as the temperature increases. For this reason, as shown in FIG. 10, even when the infrared light source emits, at its temperature of 25° C., infrared light whose peak wavelength is 950 nm that can imaged with a high sensitivity by the at least one sensor 190, the sensitivity can be decreased as described below. That is, at the temperature of 125° C. which may be an operation temperature of the infrared light source in a steady state depending on specifications of the infrared light source, the at least one sensor 190 is only able to capture the infrared light emitted from the infrared light source with a sensitivity that is reduced to an extent indicated by a dotted line 177 in FIG. 10 due to the sensitivity to red light of the image pickup element 195 and the light transmission property of the pass filter. As a result, it becomes impossible for the at least one sensor 190 to capture a clear image.

On the other hand, in the light source unit 100 according to an embodiment of this disclosure, the light source device 180 emits infrared light whose peak wavelength becomes smaller than 920 nm when the infrared light source 120 has the temperature of 25° C. or lower. Further, the peak wavelength of the infrared light emitted from the light source device 180 is shifted to the longer wavelength side as the temperature of the infrared light source 120 increases from 25° C. In this way, the light source device 180 is configured to be apt to emit infrared light whose peak wavelength lies in the range of wavelengths from 920 nm to 960 nm when the temperature of the infrared light source 120 increases to the operation temperature in the steady state. This allows the at least one sensor 190 to image the infrared light emitted from the infrared light source 120 with the high sensitivity.

It should be noted that the infrared light emitted from the infrared light source 120 in the embodiment of this disclosure is the subject to be imaged by the at least one sensor 190, rather than being used by a remote control device or the like. In this regard, although an output of the infrared light source 120 is not limited to any values, the output of the infrared light source 120 may be higher than an output of an infrared light source used for the remote control device, and may be, for example, equal to or greater than 0.3 [W].

Meanwhile, the infrared light emitted from the infrared light source 120 may be identical in properties to infrared light illuminated from the light source device 180, or may be different in properties from the infrared light illuminated from the light source device 180. Specifically, the peak wavelengths of the infrared light emitted from the infrared light source 120 and the infrared light illuminated from the light source device 180 may be either identical to or different from each other. More specifically, when the solid semiconductor element and other components constituting the infrared light source 120 are resin-molded, the peak wavelength of the infrared light emitted from the infrared light source 120 may, in some cases, differ from the peak wavelength of infrared light that has passed through molded resin. Further, the peak wavelength of infrared light which has not passed through the cover portion, such as the lens, may differ from the peak wavelength of infrared light which has passed through the cover portion, such as a lens. In the light source unit 100 according to an embodiment of this disclosure, the light source device 180 is configured to emit infrared light whose peak wavelength becomes smaller than 920 nm when the infrared light source 120 has the temperature equal to or lower than 25° C. It should be noted that the light source unit according to an embodiment of this disclosure may have a light source other than the infrared light source, and the light source may emit light other than infrared light. Even in this case, the output of the light source should be equal to or greater than 0.3 [W].

As described above, the light source unit 100 comprises the light source device 180 including the substrate 140 and the infrared light source 120 being mounted on the substrate 140, the light source device 180 capable of emitting infrared light, and the at least one sensor 190 capable of detecting the infrared light. In addition, the at least one sensor 190 is detects a wavelength component of infrared light in the rage of wavelengths from 920 nm to 960 nm better than a wavelength component of infrared light out of the range. Further, the light source device 180 emits infrared light having a peak wavelength smaller than 920 nm when the light source device 180 has the temperature of 25° C. or lower. Moreover, the peak wavelength of the infrared light emitted from the light source device 180 increases as the temperature of the infrared light source 120 increases from 25° C. Also, the at least one sensor 190 may be configured to image the infrared light.

In this way, because it is possible to prevent the image captured during the daytime by the at least one sensor 190 being affected by infrared light, the at least one sensor 190 can easily capture a clear image during the daytime. Meanwhile, the light source device 180 emits the infrared light whose peak wavelength is shifted from the wavelength smaller than 920 nm to the longer wavelength side as the temperature of the infrared light source 120 increases from 25° C. As a result, when the infrared light source 120 is increased in temperature from 25° C. to the temperature of the steady state, the peak wavelength of the infrared light at that temperature is apt to lie in the range of wavelengths from 920 nm to 960 nm. This can allow the at least one sensor 190 to capture the infrared light emitted from the light source device 180 with the high sensitivity during the nighttime, and, in turn, allows the at least one sensor 190 to output a clear image.

The light source unit 100 may satisfy one or more of below described requirements which are optional and should not be recognized as essential requirements.

As one of the requirements, the light source device 180 may emit infrared light having a peak wavelength smaller than 920 nm when the infrared light source 120 has a temperature of 40° C. or lower. Here, the peak wavelength of the infrared light may increase as the temperature of the infrared light source 120 increases from 40° C.

As one of the requirements, the light source device 180 may emit the infrared light having the peak wavelength in the range of wavelengths from 920 nm to 960 nm when the infrared light source 120 has a temperature from 110° C. to 160° C.

As one of the requirements, the light source device 180 may emit the infrared light having the peak wavelength in the range of wavelengths from 920 nm to 960 nm when the infrared light source 120 has a temperature from 120° C. to 150° C.

In one of the requirements, the steady state is defined as a state in which a heat generating quantity of the infrared light source 120 becomes substantially equal to a quantity of heat radiated from the infrared light source 120 during operation of the infrared light source 120, so that the temperature of the infrared light source 120 is maintained substantially constant without changing with time. Further, in this requirement, an environmental temperature under a service condition of the light source unit 100 on the Earth is assumed to be from −40° C. to 50° C. Then, the light source device 180 may emit the infrared light having the peak wavelength in the range of wavelengths from 920 nm to 960 nm when the environmental temperature is from −40° C. to 50° C. and the infrared light source 120 is in the steady state.

Further, as one of the requirements, the light source device 180 may emit the infrared light having peak wavelength in the range of wavelengths from 920 nm to 960 nm when the temperature of the infrared light source 120 matches an absolute maximum rated temperature which is the highest permissible temperature of the infrared light source 120.

According to the above configurations, it is facilitated that, during most of actual operation time of the infrared light source 120, the peak wavelength of the infrared light emitted from the infrared light source 120 lies in the range of from 920 nm to 960 nm. This can increase a possibility that the infrared light emitted from the light source device 180 can be imaged with a further improved sensitivity of the at least one sensor 190, and can, in turn enhance a possibility that a clear image can be captured even during the nighttime.

It is to be understood that the present disclosure is not limited to the above-described embodiment or modifications thereof, and may be altered or changed in various ways within the scope of matters defined in the accompanying claims of this application and within the scope of equivalents of such matters.

In the above embodiment, for example, it has been described that the cover part is composed of the lens 130. However, the cover part may be a transparent cover which does not function as a lens. The light source unit 100 has been described with reference to the case where it is mounted on the vehicle 200. However, the light source unit may be mounted on any movable bodies other than the vehicle, and may be mounted on, for example, an airplane, a ship, a hover craft, a drone, a conveyer machine in a warehouse, or a robot. Meanwhile, the light source unit may not necessarily be installed in the movable body, and may be installed in, for example, a stationary surveillance camera, or a portable image pickup camera used for photographing a wild animal or other subjects.

Moreover, while the infrared light source 120 has been described with respect to the example of being formed of the LED, the light source may be a semiconductor light emitting element other than the LED, and may be implemented by, for example, a semiconductor laser element or the like. Alternatively, the light source may be a solid light emitting element, such as an organic EL (Electro Luminescence) element or an inorganic EL element. Further, the infrared light source 120 may be incorporated into an LED module having an SMD (Surface Mount Device) structure, or an LED module having a COB (Chip On Board) structure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A light source unit, comprising:
   a light source device configured to emit infrared light, the light source device comprising a substrate and a light source mounted on the substrate; and
   at least one sensor configured to detect the infrared light, wherein
   the at least one sensor detects a wavelength component of the infrared light in a range of wavelengths from 920 nm to 960 nm better than a wavelength component of the infrared light out of the range,
   the light source device emits the infrared light having a peak wavelength smaller than 920 nm when the light source has a temperature of 25° C. or lower, and
   the peak wavelength of the infrared light emitted from the light source increases as the temperature of the light source increases from the temperature of 25° C.

2. The light source unit according to claim 1, wherein
   the light source device emits the infrared light having the peak wavelength smaller than 920 nm when the light source has a temperature of 40° C. or lower, and
   the peak wavelength of the infrared light emitted from the light source device increases as the temperature of the light source increases from the temperature of 40° C.

3. The light source unit according to claim 1, wherein the light source device emits the infrared light having the peak wavelength in the range of wavelengths from 920 nm to 960 nm when the light source has a temperature from 110° C. to 160° C.

4. The light source unit according to claim 1, wherein
   when a steady state of the light source is defined as a state in which a heat generating quantity of the light source is substantially equal to a quantity of heat radiated from the light source during operation of the light source, the temperature of the light source is maintained substantially constant without changing with time when the light source is in the steady state, and
   the light source device emits the infrared light having the peak wavelength in the range of wavelengths from 920 nm to 960 nm when an environmental temperature is from −40° C. to 50° C. and the light source is in the steady state.

5. The light source unit according to claim 1, wherein the light source device emits the infrared light having the peak wavelength in the range of wavelengths from 920 nm to 960 nm when the light source has a temperature equal to an absolute maximum rated temperature.

6. The light source unit according to claim 1, further comprising:
   a light source cover comprising a flange portion that contacts, one of directly or indirectly, the substrate, and a cover portion which is configured to cover an emission side of the light source; and
   a heat sink that contacts, one of directly or indirectly, the light source cover, the heat sink being configured in conjunction with the light source cover to seal the light source from an outside region, the heat sink having a thermal conductivity greater than a thermal conductivity of the light source cover; and
   an annular sealing portion that is between the light source cover and the heat sink, wherein
   the flange portion includes a multilayer structure comprising at least two layers.

7. The light source unit according to claim 6, wherein the flange portion comprises a color-tinted layer and a transparent layer.

8. The light source unit according to claim 6, wherein the flange portion comprises a first flange portion having a first thickness and a second flange portion having a second thickness smaller than the first thickness.

9. The light source unit according to claim 6, wherein the cover portion is configured to function as a lens.

10. The light source unit according to claim 1, wherein
the at least one sensor comprises a pass filter, and
the pass filter is configured to block at least light including a wavelength from 700 nm to 860 nm and a wavelength equal to or greater than 1100 nm, and pass at least light including a wavelength from 890 nm to 980 nm.

11. The light source unit according to claim 1, wherein an output of the light source is equal to or greater than 0.3 W.

12. A movable body comprising the light source unit according to claim 1, wherein the light source unit is installed at a position where the light source device is configured to emit the infrared light toward an outside region of the movable body.

13. The light source unit according to claim 1, wherein the at least one sensor is configured to image the infrared light.

* * * * *